(12) United States Patent
Amo et al.

(10) Patent No.: US 6,250,428 B1
(45) Date of Patent: *Jun. 26, 2001

(54) INFORMATION DISPLAY SYSTEM

(75) Inventors: Stephen D. Amo, Oakville; Dean L. Lacheur; Neil S. Lacheur, both of Toronto, all of (CA)

(73) Assignee: Verticore Communications Ltd., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/457,867

(22) Filed: Dec. 10, 1999

Related U.S. Application Data (63) Continuation of application No. 09/154,633, filed on Sep. 17, 1998, which is a continuation of application No. 08/834,876, filed on Apr. 10, 1997, now Pat. No. 5,844,181.

(30) Foreign Application Priority Data

Mar. 12, 1997 (CA) .................................................. 2199757

(51) Int. Cl.$^7$ ....................................................... B66B 1/34
(52) U.S. Cl. ........................................ 187/391; 127/396
(58) Field of Search ..................................... 187/396, 397, 187/395, 414, 247, 391, 393

(56) References Cited

U.S. PATENT DOCUMENTS

| | | | |
|---|---|---|---|
| 4,749,062 * | 6/1988 | Tsuji et al. ............................. | 187/139 |
| 4,852,696 * | 8/1989 | Fukuda et al. ......................... | 187/139 |
| 4,860,207 * | 8/1989 | Kubo ..................................... | 187/124 |
| 4,995,479 * | 2/1991 | Fujiwara et al. ...................... | 187/135 |
| 5,042,620 * | 8/1991 | Yoneda et al. ........................ | 187/124 |
| 5,056,629 * | 10/1991 | Tsuji et al. ............................ | 187/139 |
| 5,099,319 | 3/1992 | Esch et al. . | |
| 5,283,639 | 2/1994 | Esch et al. . | |
| 5,551,532 * | 9/1996 | Kupersmith .......................... | 187/391 |
| 5,606,154 * | 2/1997 | Doigan et al. ......................... | 187/396 |
| 5,844,181 * | 12/1998 | Amo et al. ............................ | 187/396 |
| 5,955,710 * | 9/1999 | DiFranza .............................. | 187/396 |
| 6,082,500 * | 7/2000 | Amo et al. ............................ | 187/391 |

* cited by examiner

*Primary Examiner*—Jonathan Salata
(74) *Attorney, Agent, or Firm*—Finnegan, Henderson, Farabow, Garrett & Dunner, L.L.P.

(57) ABSTRACT

The invention relates to a system and method for simultaneously displaying advertising and general news information in elevator cabs and waiting areas. The invention consists of a plurality of display monitors coupled to a plurality of servers. In operation, a first server receives a program schedule with associated advertising and general news information over a communication link from at least a second server. At predetermined times according to the program schedule, the first server transmits the advertising and general information to associated display monitors for viewing by passengers in the elevator cabs. The display monitors and associated servers are each individually addressable thus allowing them to be simultaneously updated from a remote location with new program schedules, news updates, customized advertising information and the like.

8 Claims, 8 Drawing Sheets

INFORMATION DISPLAY SYSTEM

This application is a continuation of U.S. application Ser. No. 09/154,633 filed Sep. 17, 1998, which is a continuation of application Ser. No. 08/834,876 filed Apr. 10, 1997, now U.S. Pat. No. 5,844,181.

This invention relates to an information transmission and display system and in particular to an information display system for displaying advertising and general news information in elevators and the like,

BACKGROUND OF THE INVENTION

In most urban centers, exposure to information such as advertising information and current news information has become an accepted part of everyday life. Apart from newspapers, magazines and television, mass advertising information is presented by way of billboards and more recently pixelboards™, which are capable of displaying relatively simple arimated pictures and textual information, However as with most information and in particular with respect to advertising information, it is more effective to have both a captive audience and a well-targeted group in order to maximize the effectiveness and impact of the information conveyed. Most urban centers have a large number of major office complexes. These office complexes include multi-storied buildings serviced by elevators and large common areas providing a heretofore unexploited environment for presentation of advertising and news information. Display systems for these environments should amongst others have the ability to target specific audiences with the information they present, respond quickly and easily to information changes, and provide a consistent high quality image and information content.

To date, information display systems for elevators are capable of presenting at most the floor number, a floor directory of tenants and in some cases simple text based news information. For example, U.S. Pat. No. 4,995,479 to Fujiwara, describes a display apparatus for an elevator in which information regarding the operating conditions of the elevator is displayed along with "general" information, such as news and weather. A display unit is provided within the elevator cab and includes a display area for displaying text along side a picture display area for displaying predetermined graphic images. Predetermined pieces of information are assembled and assigned a number indicative of a priority for that piece of information. The information is selected to be displayed according to the priorities assigned. Limitations of this system are that the messages are not easily updateable and information is restricted to basic text and primitive graphic data. Furthermore, the system does not provide for an easily updateable real time information delivery and display system.

In U.S. Pat. No. 5,056,629 to Tsuji, et al., a display apparatus for an elevator is described, in which information concerning news, weather, etc., is displayed on a display screen located within the elevator cab. The information is selected to be displayed at predetermined times. The device described in this patent allows for the information displayed to be corrected (i.e. other information displayed) through inputs made remotely from the elevator cab, for example, from a caretakers room or a portable computer. Once again this patent discloses a simple scrolling message display system, which although updateable via a remote computer, requires extensive user intervention to constantly update the displayed messages. Furthermore, the display of the information is dependent to some extent on the operational parameters of the elevator.

In U.S. Pat. No. 5,485,897 to Matsumoto, et al., an elevator display system is disclosed in which the operational information of the elevator, in particular a floor indicator, is superimposed on a background image on a display screen The background image is described as being a plurality of still pictures assigned to the different floors at which the elevator stops or different kinds of animations assigned to the different floors. Once again, this patent does not disclose a method of simultaneously altering the information in a series of elevators independent of a particular elevator operational state.

Thus, based on the current state of the art regarding elevator and foyer display systems, there is a need for a system for displaying real time information content targeted to a specific audience and which provides that the information is centrally coordinated and disseminated. Furthermore, currently available systems do not provide a system that is completely site addressable with the potential for a building, including multiple elevator banks within a building, to have its own unique daily program. Furthermore, there is a need for a system that is capable of communicating on a daily basis new information relevant to tenants or users of the building and which is capable of replacing the relatively ineffective paper and poster notification methods currently in use along with the associated manpower costs. Furthermore there is a need for a system that makes use of display technology that offers highly legible, easily understandable stills, animated graphics, pictures and videos.

There is also a need for a display system that is both flexible that can be installed in existing elevator banks and can provide an advertiser impact close to the point of purchase and can effectively target an extremely attractive market place and which does not necessarily require extensive government regulatory approval.

SUMMARY OF THE INVENTION

This invention seeks to provide in an information display system an information display apparatus and a method for easily updating displays in the system such that information composed at a centralized location may be easily presented at the displays.

It is an object of the present invention to provide general information display units which may be located in elevator cabs and waiting areas.

A further object of the invention is to facilitate remote control and automated information updates, simultaneously, to a number of display units located in elevator cabs and waiting areas.

A further object of the invention is to provide time sensitive information to the display units, and to provide such information independent of elevator operation.

A further object of the invention is to provide an information and advertising presentation in a relatively easily understandable manner utilizing a relatively high-resolution display capable of displaying amongst others, picture quality advertising and information graphics and all manner of information display including still images, 2-D and 3-D computer animations and full motion video and which may be easily integrated into existing elevator cabs and waiting areas.

In accordance with this invention there is provided a device for displaying information in at least one elevator cab, the device comprising:

a display means including a display screen located in each elevator cab said display adapted to receive and display information on said screen, a building server located in the building in which each elevator cab is located, the building server being adapted to communicate information to each display means; and a central server remotely located from the building serven,
wherein the information to be displayed is transmitted
from the central server to the building servers and then
to the display means.

BRIEF DESCRIPTION OF THE DRAWINGS

These and other advantages of the present invention will become more apparent from the following discussion of preferred embodiments of the invention and which are described by way of example only with reference to the accompanying drawings in which like elements have been assigned like numerals and wherein.

DESCRIPTION OF A PREFERRED EMBODIMENT

Figure 1:
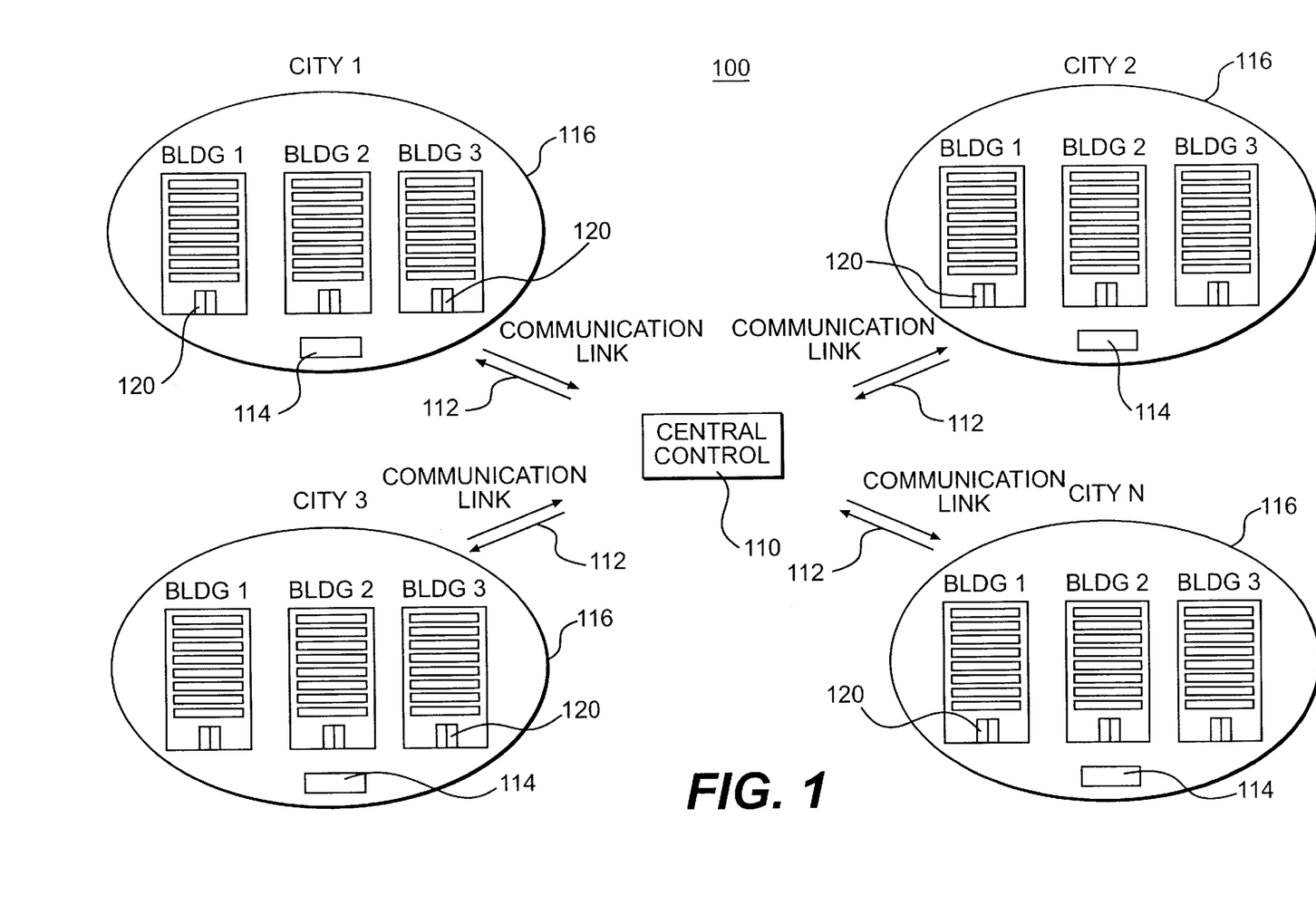
FIG. 1 is a block diagram showing a network configuration of an information display system according to an embodiment of the invention.

Referring to FIG. 1, a schematic network architecture is shown generally by numeral 100. The network includes a centralized control center or system server 110 which communicates via suitable communication links 112, with city control center servers 114. Each city may include one or more servers 114, however each server 114 has associated, therewith, a number of buildings in a given city. The group of buildings serviced by the city server 114 is identified by reference numeral 116. Although a single city server 114 is shown per city group, this may include more than one city server within a given city.

The city servers 114 then communicate in turn with individual buildings within its group 116 via communication links, for example via a telephone line, a wireless communication, infrared or any suitable communication link. Within each building, for convenience is located a further server denoted a building server 120 which is then responsible for communicating with the individual elevator banks within the building. A display unit 210 is located within each elevator bank for displaying the information communicated thereto. In a further embodiment of the invention, the central server may be configured to communicate directly with the building servers and not necessarily via the city servers. For clarity, buildings may include a group of buildings, such as for example, an office tower cluster comprising several distinct office towers.

Figure 2:
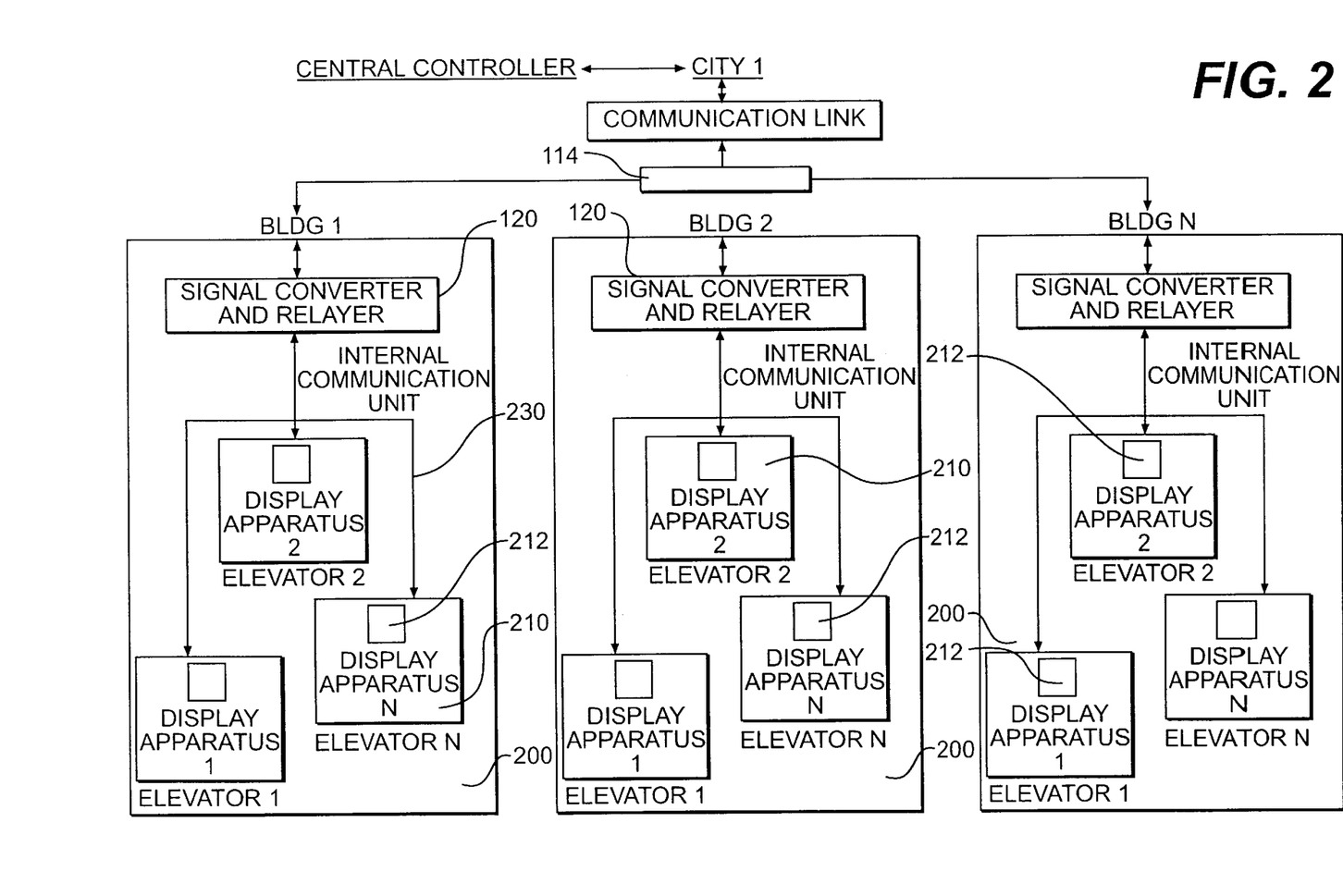
FIG. 2 shows a network configuration for a specific aspect of the general network configuration.
Figure 3:
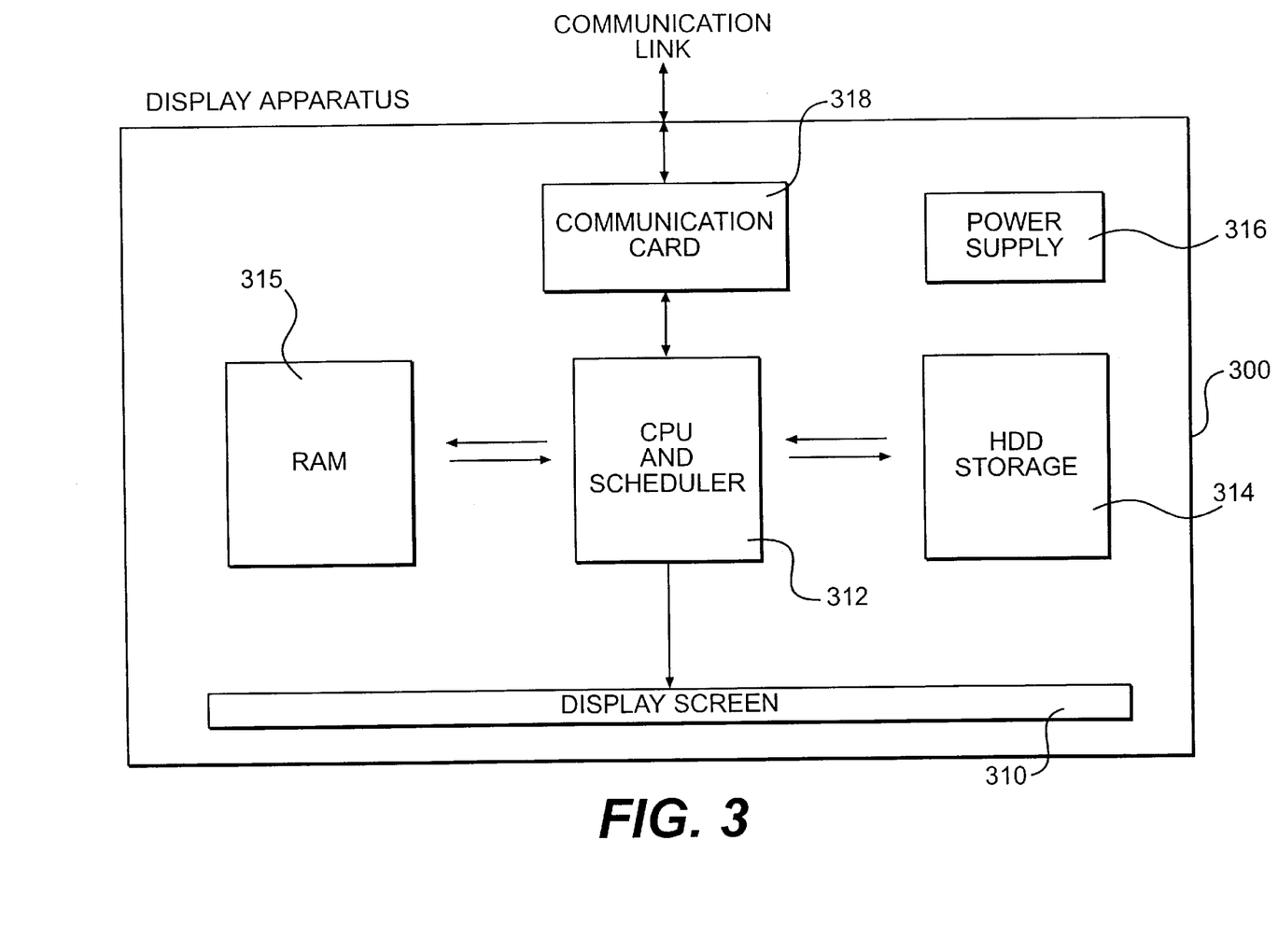
FIG. 3 is a schematic block diagram of a display unit.

The architecture of the network within a building is shown in greater detail with reference to FIG. 2. Referring to FIG. 2, an office complex includes one or more buildings 200. The buildings 200 are serviced by one or more elevator cabs 210. Within each elevator cab is located a display means 212 which is a self contained unit including a flat screen display 310, typically a liquid crystal display, a microprocessor 312, a mass storage device 314, a memory (RAM) 315 and a power supply 316 as shown in FIG. 3 The building server 220 is connected to each display means 212 within each elevator cab via a cable 230 which may be included within the bundle of cables already provided to the elevator cab. In a further embodiment, however, the display and the building may include wireless communication devices. As it is anticipated the present system will be retrofitted into existing elevators, the use of a wireless communication link between the display and the building server is desirable as the existing wiring to the elevator may be difficult to access. Furthermore, by providing a display which is separate to the existing elevator control system obviates the need to obtain authorization from elevator service companies to perform maintenance or updates on the information display system.

By providing individual servers 220 within a building which are individually and uniquely addressable allows in addition to common information to be received by all other buildings, but the ability to add additional individualized information pertaining to a specific building to the general information content. For example, a building landlord might include with the regular programing information, information on interruptions due to maintenance, emergency procedures, vacancies, etc. Also, with the proliferation of shops within building complexes, advertising information for these businesses may also be easily included with the building specific information. However, it may be seen that because the buildings are serviced by centralized city server 114, the bulk of the information displayed is synchronized with each building and the building specific information will not interrupt the information transmitted to other buildings within the network, while still maintaining centralized control and delivery of generalized information to the other elevator display units within the city. Furthermore, although the system is capable of displaying information without interfering with the elevator control system, floor numbers and floor specific tenant information may also be displayed on the screens. This information may be derived from the elevator control system without interfering with the display of advertising or other news information which is displayed simultaneously in the elevator cabs.

In FIG. 3, a detailed block diagram of the display device is shown generally by numeral 300. The display device includes an electronic communication means 318 such as an Ethernet card or other suitable network protocol card. The communication means 318 may also support RF, or infrared signals. The display also includes a computer 312, memory 315, mass storage device 314 (such as a hard disk drive) and a suitable power supply 316. A display screen 310 is also provided for displaying relevant information, most typically this is a color liquid crystal display as used for example in laptops. The display unit components are encased in a suitable housing (not shown) which may be customized to be esthetically integrated with the elevator cab interior.

In a further embodiment of the invention, information to be displayed on the display screen is transmitted to the building servers 220 and then transmitted in real time according to a schedule stored on the building servers 220 to the displays. This embodiment provides for a relatively less expensive display within each elevator cab as it is not required that the displays include a processor or storage device. Furthermore, in some instances where space in a elevator cab is at a premium it is more advantageous to implement this embodiment.

Figure 4:
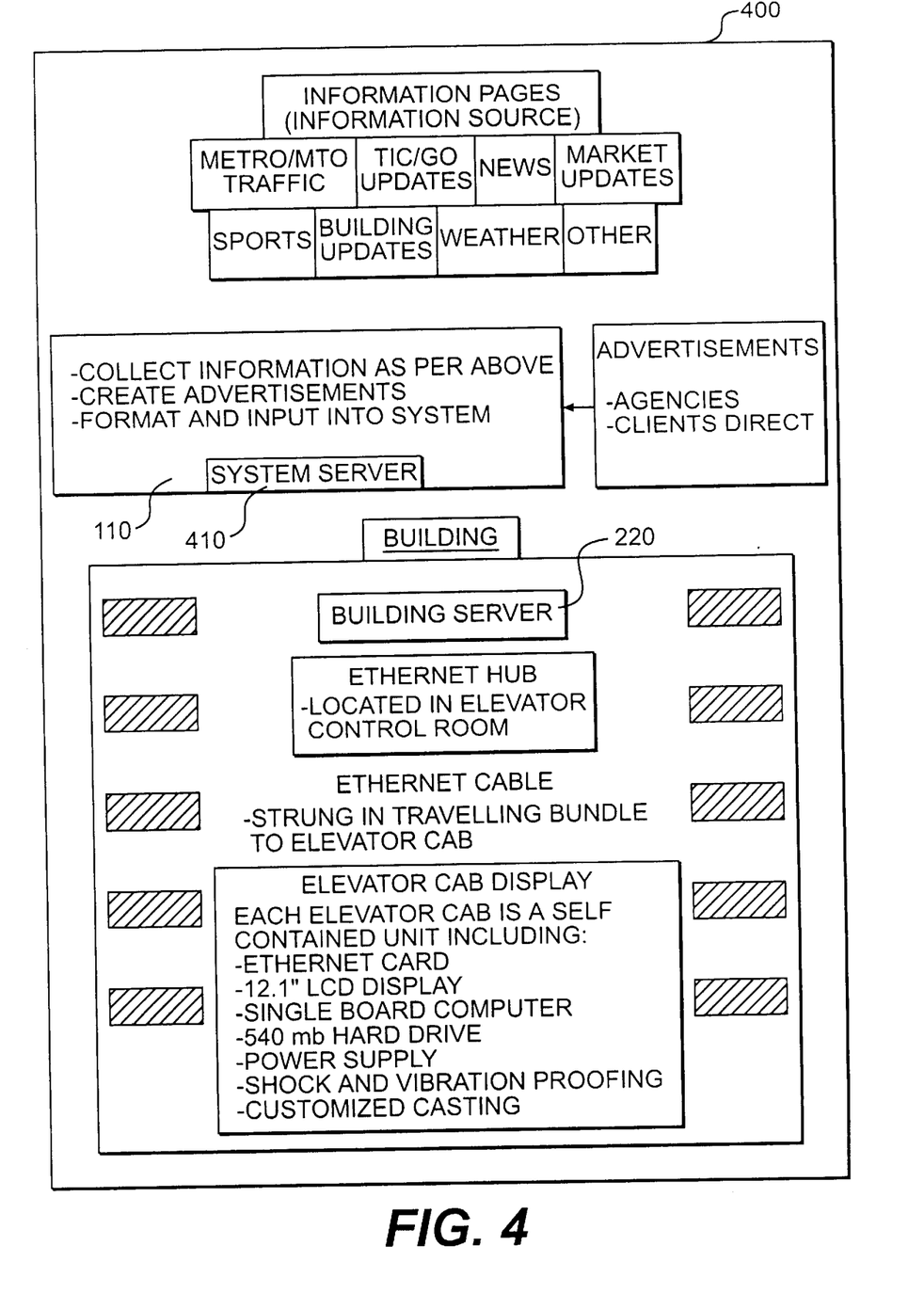
FIG. 4 is a schematic diagram of the information flow from a central control to a display.

Referring to FIG. 4, the flow of information from the centralized control center 110 to the individual displays within the elevator cab is shown generally by numeral 400. The control center referred to previously in FIG. 4 includes a system server computer 410 which gathers information pages for transmission to the various building servers, These information pages may include amongst other, traffic reports, subway or train schedule updates, news clippings such as business and financial news, stock market updates, sports, weather and any other information of relevance to all or specific cities. In addition, the information may include building updates which is information specific to a specific building or groups of buildings within a city or across cities.

For example, in North America, it is not unusual for a single real estate company to own various office complexes in different cities. Should it be desired that building information is to be provided to all their buildings, this information may be compiled at the system server site and appended to the existing general information. Because all building servers are individually addressable from the system server, the specific information destined for the requisite buildings may be communicated to their respective displays without effecting the information being displayed in other buildings. Once delivered to the building server, the information is relayed to the appropriate displays via the internal communication links of the building that as mentioned earlier may include wired, wireless or infrared links. In this manner, a display unit in any location can be reached from a central control point and information provided thereto in a consistent and timely manner. Furthermore, since the displays are individually addressable, advertising, information and scheduling updates are addressed to specific displays only when and where appropriate.

Figure 6:
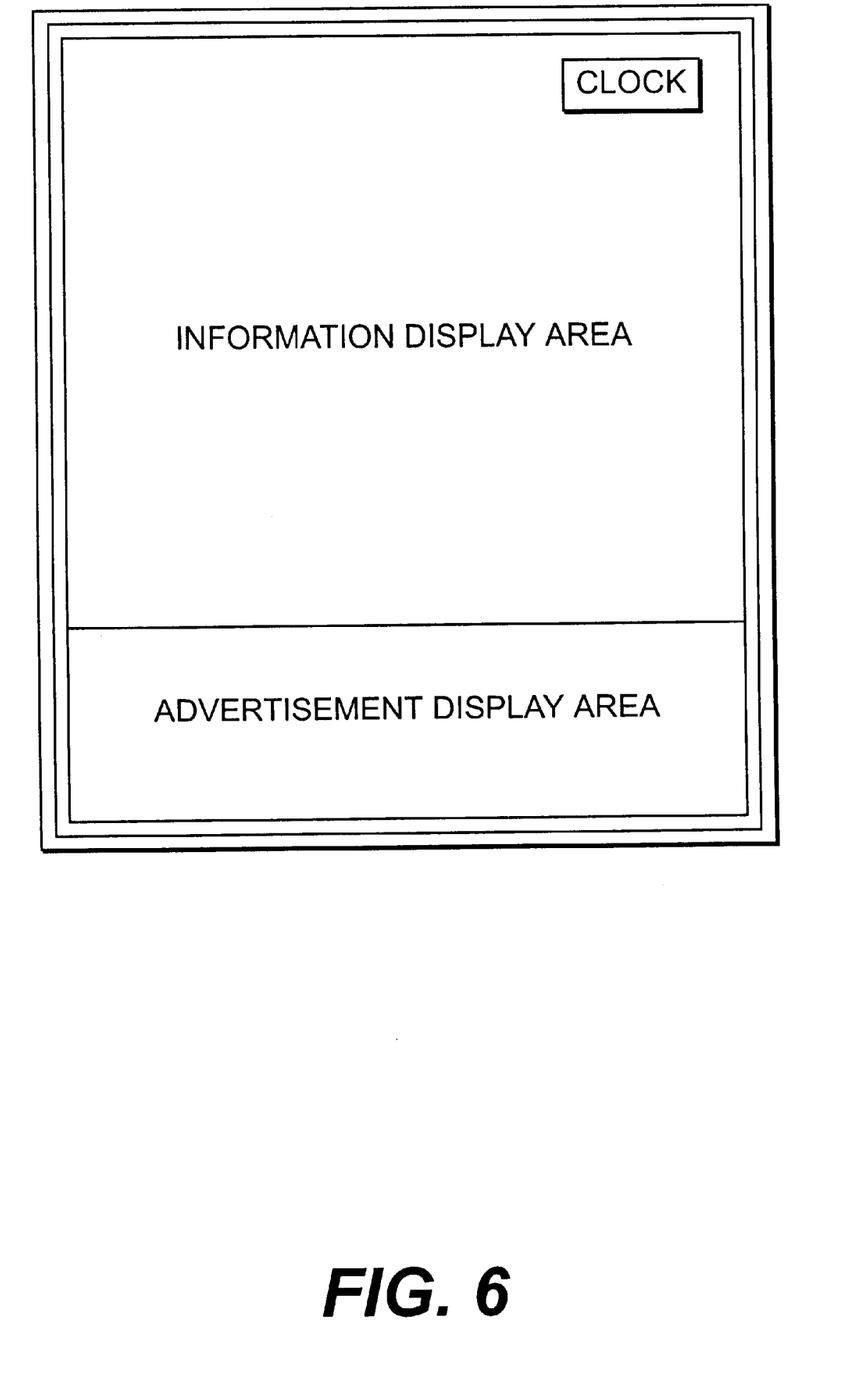
FIG. 6 shows a front view of an information display monitor.

Once the relevant information has been communicated to the appropriate display apparatus in the elevator cabs, the information is processed by the computer within the display apparatus and then forwarded to the display screen. Referring to FIG. 6, the display screen may be divided into two general areas, namely an information display area and an advertisement display area. Thus, both types of information may be simultaneously displayed. A different number of display areas within a given screen may also be implemented.

Figure 5:
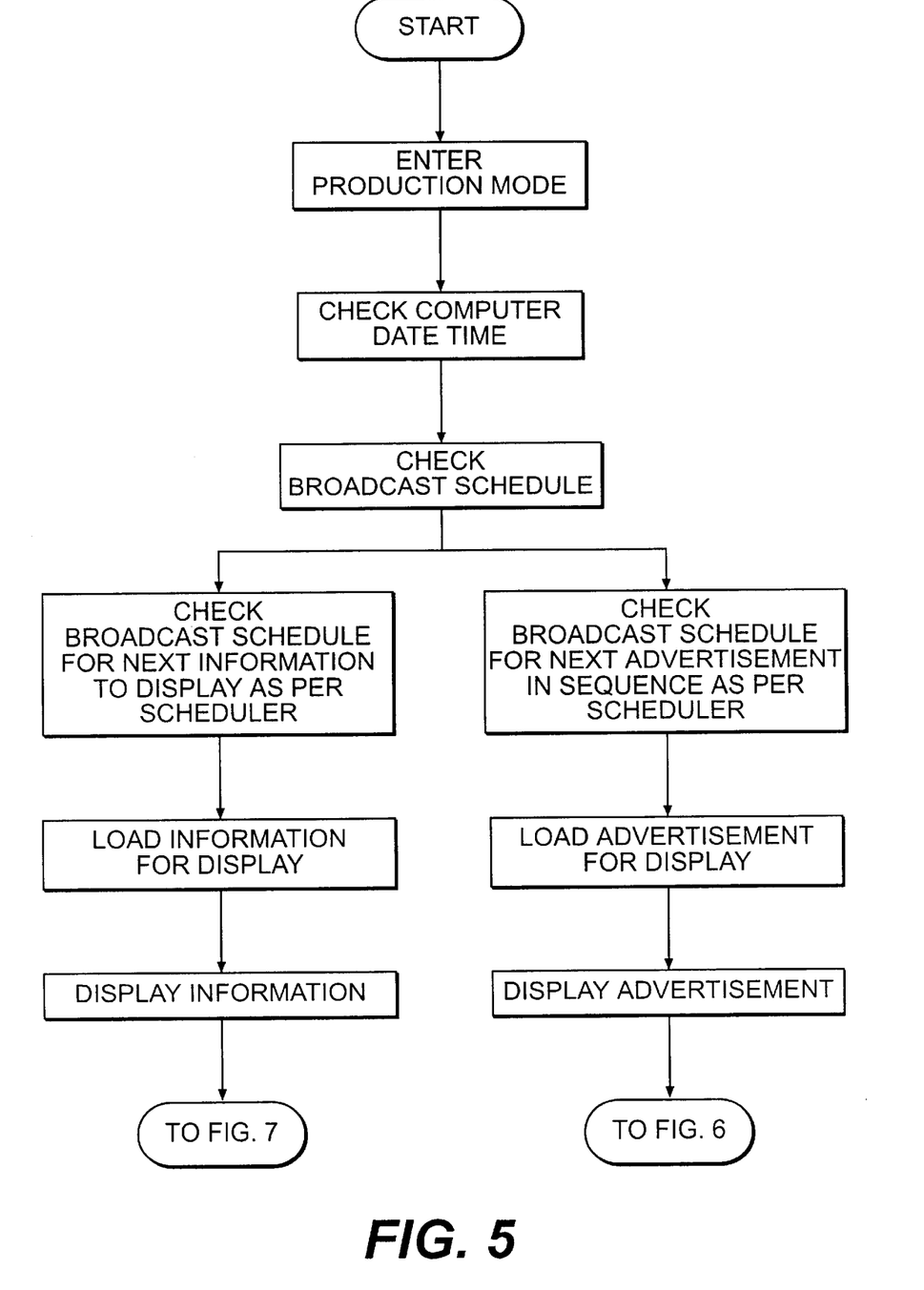
FIG. 5 is a flow chart showing the operation including updated and control of the display.
Figure 8:
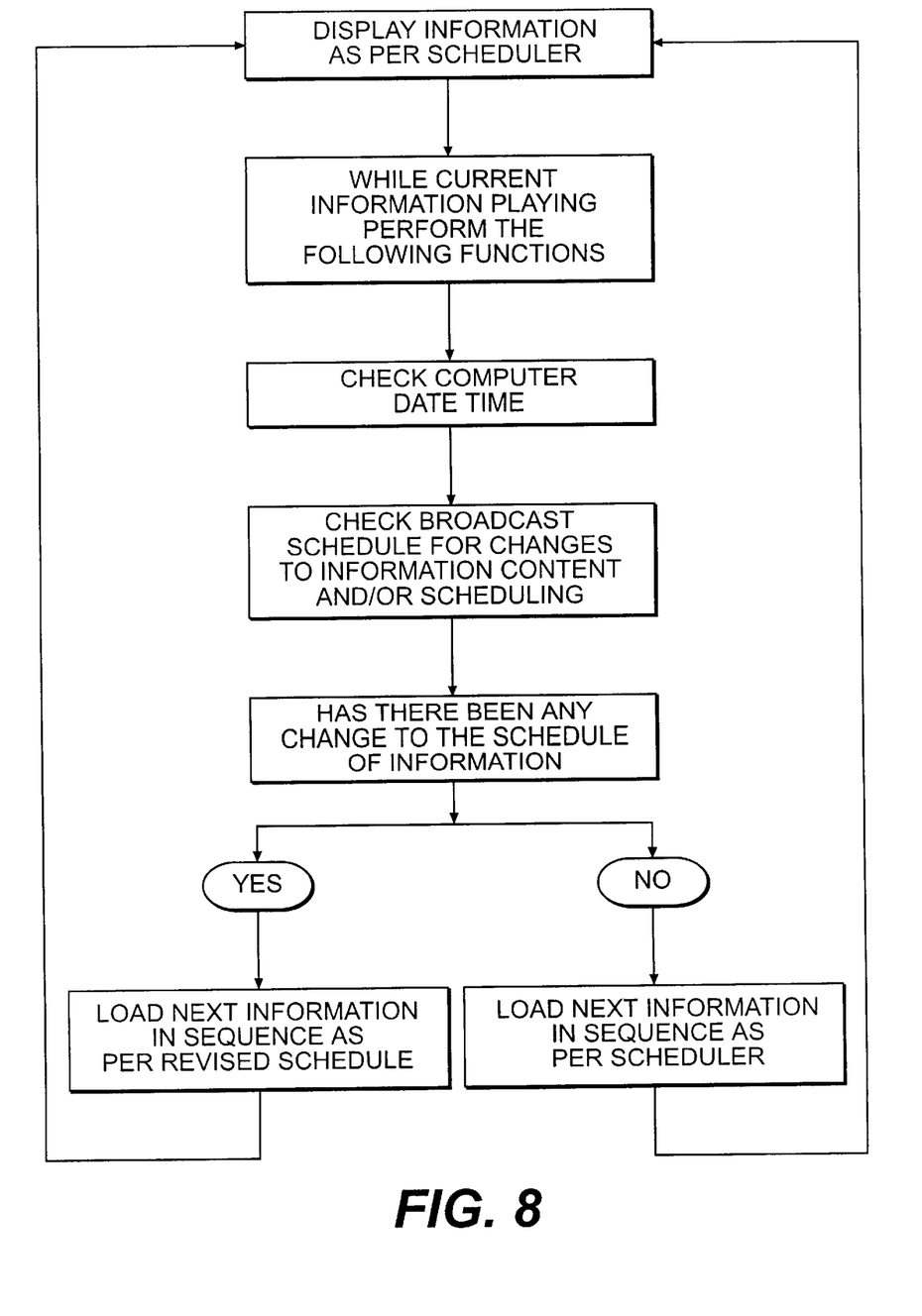
FIG. 8 is a further flow diagram showing the update of information to the display.

Referring to FIG. 5, information to be displayed on the screen is transmitted to the display apparatus as described earlier along with a broadcast schedule. The broadcast schedule determines when the next information or advertisement information is to be displayed and in what sequence they are is to be displayed. As may be seen in FIG. 8, the processor within the display apparatus checks the broadcast schedule and based thereon, directs the appropriate information from the mass storage device to the display screen which then displays the information in the appropriate area of the screen. While the appropriate information is being displayed on the screen, the processor performs a constant check of the date and time and then performs a check for any changes in the broadcast schedule. Changes in the broadcast schedule may include changes in content of information to be displayed or times at which the information is to be displayed or both. If there has been a change in any of the information content or the scheduled times of display of the information, the appropriate information is loaded as per the revised schedule and displayed on the screen with reference to the sequence in FIG. 5.

Figure 7:
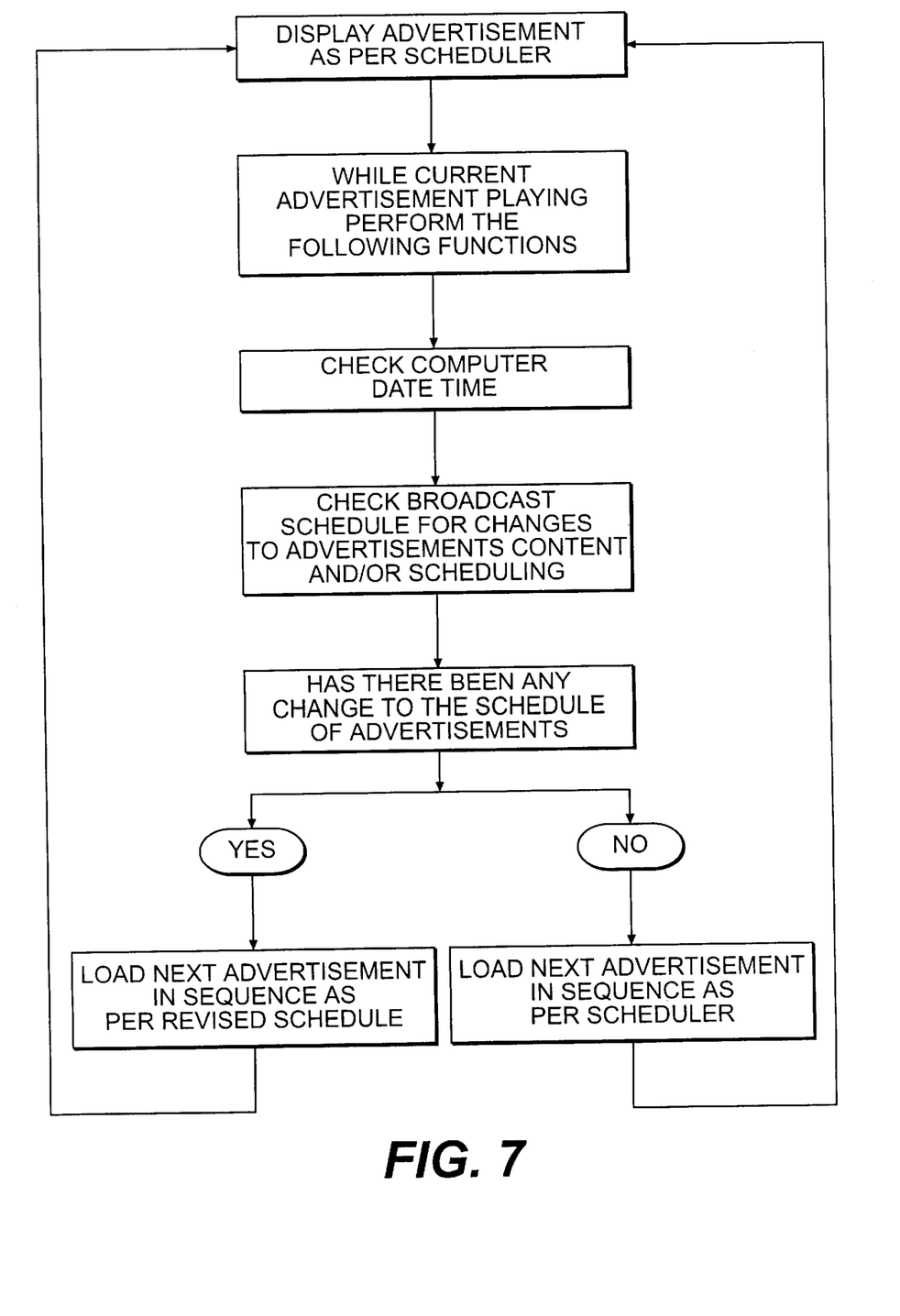
FIG. 7 is a flow diagram showing the update of advertising information to the display.

A similar check for changes in the content and time sequence display of the advertising information is performed as indicated in FIG. 7. Thus, it may be seen that concurrent to the display of current advertising and current information, the display apparatus checks for updates to the advertising or the information content and schedule and loads the next appropriate advertising or information content for display. When the currently displayed advertisement or general information content has completed displaying the next scheduled advertisement or information is thus displayed. This sequence of events thus provides for seamless change of information and advertising.

Further, there can be an unlimited number of information screens scheduled for display which may be further displayed in any combination and for any predetermined length of time. The information displayed may include high quality computer generated graphics or picture quality static images displayed for a predetermined period of time, videos, animations or any combination of information. Furthermore, there is also provided in an alternative embodiment the facility for including sound with the images.

In the above embodiment, the information to be displayed on the screens is uploaded from the building server computer to the individual display units in the elevator cab, where the information is then processed according to the schedule included with the information. In another embodiment, the information may be fed in real time from the building server to the display unit and where the display apparatus does not store any significant amount of information thereon. Furthermore, the display apparatus may also provide for the return of diagnostic or maintenance information back to the server in order that the display unit may be monitored remotely without the need for maintenance personnel intervention, thus further reducing the overall cost of the system. In a still further embodiment, the building server may receive information for display not only from the central server, but other information sources such as CNN, sports or direct Internet access.

Thus it may be seen that the information display system of the subject invention may be implemented in various forms. Although the embodiments are shown with reference to specific examples, other modifications may be possible. For example, an embodiment of the present invention may equally well be utilized in subway cars, hospitals, trains or other similar places. The individual buildings may also include several servers. These and other modifications to the variations upon the preferred embodiments are provided for by the present invention, the scope of which is limited only by the following claims.

We claim:

1. An elevator display system for use with an elevator in a building, the elevator display system comprising:

a first server;

at least a second server coupled to said first server, said at least second server adapted to:

receive scheduling information over a data communication link from said first server;

utilize the scheduling information to retrieve display data stored in a mass storage device; and transmit the display data to a display located in an elevator.

2. The elevator display system of claim 1, wherein the display data is general and commercial information.

3. The elevator display system of claim 1, wherein the server is located in said building.

4. The elevator display system of claim 1, wherein the server is located in a remote production center.

5. The elevator display system of claim 1, wherein the second server is located in said building.

6. A method of providing general information and commercial information to an elevator display unit within an elevator located in a building, said elevator display unit coupled to a plurality of remote servers over a data communication link, the method comprising:

providing scheduling information from a first server to a second server;

retrieving display information from a mass storage device coupled to said second server, in accordance with the scheduling information; and displaying the display information on a display coupled to the second server according to the scheduling information.

7. The method of claim 6, wherein the retrieving step is further comprised of:

identifying general and commercial information to be displayed from said scheduling information; and retrieving the general and commercial information from the remote server.

8. The method of claim 6, wherein the retrieving step is further comprised of:

identifying general and commercial information to be displayed from said scheduling information; and retrieving the general and commercial information from at least said second server.

\* \* \* \* \*